June 29, 1943.   G. C. FRENCH   2,322,842
EMERGENCY PLUG FOR WATER PIPES
Filed July 25, 1942
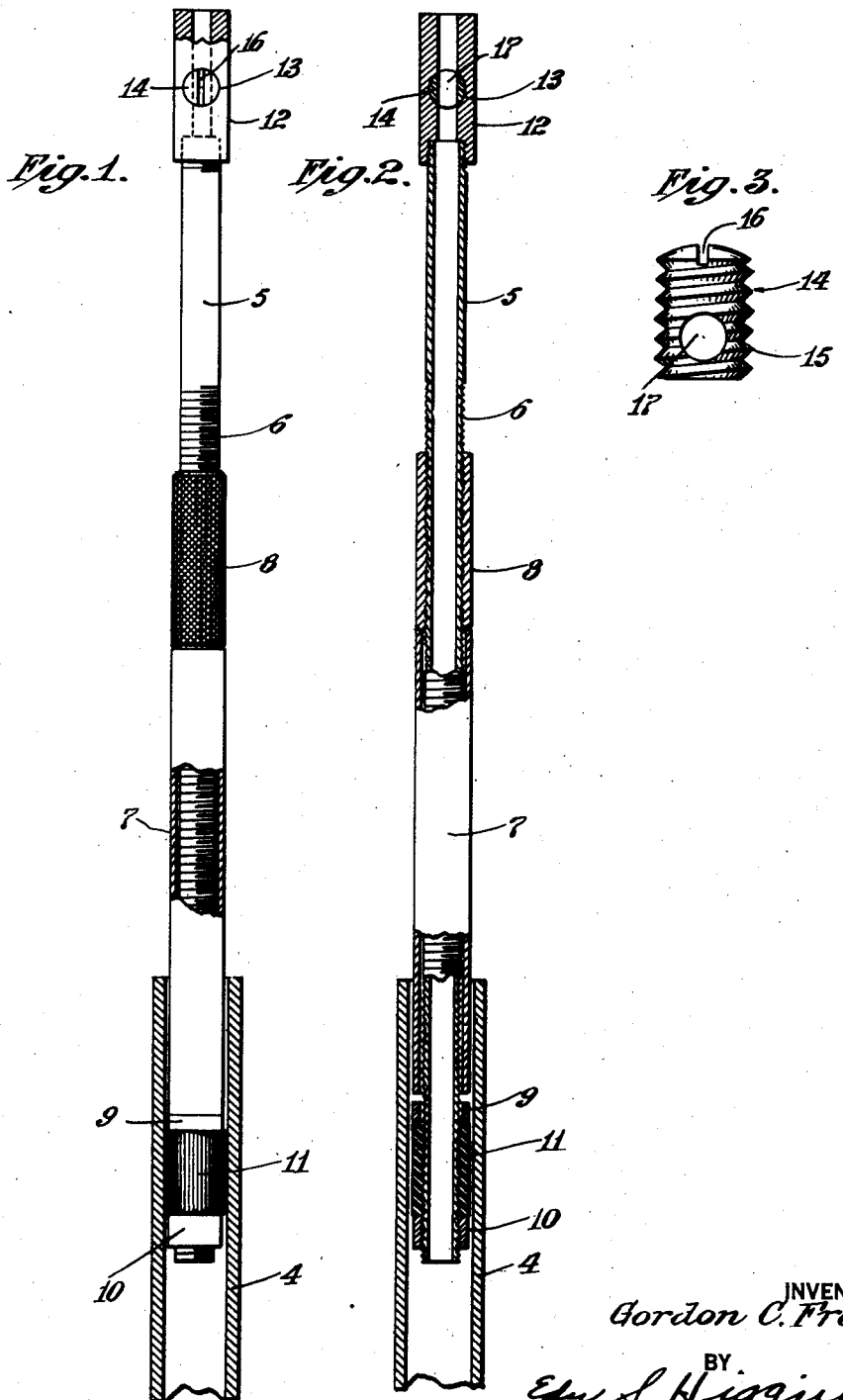
INVENTOR
Gordon C. French
BY
Edw. S. Higgins
ATTORNEY Patented June 29, 1943

2,322,842

UNITED STATES PATENT OFFICE 2,322,842

EMERGENCY PLUG FOR WATER PIPES

Gordon C. French, Yonkers, N. Y.

Application July 25, 1942, Serial No. 452,284

1 Claim. (Cl. 138—89)

This invention relates generally to emergency plugs for stopping and controlling the flow of water through water pipes in an emergency.

An object of my invention is to provide a plug that shuts off the water and at the same time permits a tool to be inserted thereover for repairing the broken pipe.

Another object is to provide such a tool with a a valve member that is conveniently manipulated.

Another object is to provide a tool that readily and gradually controls the flow of water until the flow is completely shut off.

Another object is to provide a plug that is especially adapted for insertion in pipes having small diameters, such as a one-half inch pipe usually found in houses.

Another object is to provide such a plug that is portable, completely assembled as a unit, simple, compact and inexpensive in construction and positive in action.

My invention will be better understood from the description thereof to follow taken in connection with the accompanying drawing in which—

Fig. 1 is a view of my improved plug in elevation, in operative position in a water pipe, the pipe being shown in section.

Fig. 2 is a longitudinal sectional view of my improved plug.

Fig. 3 is a detail view of the improved valve mechanism.

My improved plug is used for plugging water pipes of any length. A section of a pipe 4 is shown in Fig. 1. The plug comprises an elongated metal tubular member 5 externally screw threaded at both ends and for a portion adjacent its center as indicated at 6. Slidably mounted on the tube 5 is a metal sleeve 7 and mounted on said tube to one side of the sleeve 7 is an elongated travelling nut 8 in threaded engagement with the threaded portion 6 of the tube. On the other side of the sleeve is a metal washer 9. A metal nut or washer 10 is fastened to one end of the tube 5 in any suitable manner. On the tube between the washers 9 and 10 is an elongated rubber sleeve or washer member 11. This sleeve member 11 is adapted to be expanded or bulged radially when pressure is exerted against its inner end.

On the opposite end of the tube 5 is fastened an interiorly screw threaded tubular metal sleeve 12 having oppositely disposed lateral openings 13, the outer end of said sleeve being open. Rotatably mounted in the lateral openings 13 is a valve member 14. This valve 14 comprises an externally screw threaded cylindrical body portion 15 with a slot 16 in its upper surface for receiving a tool. The threads on the body portion engage internal threads of the openings 13. The body portion 15 is formed with a transverse opening 17. The upper end of the body portion is curved to conform to the curvature of the sleeve 12 and is normally flush with the outer surface of the sleeve.

It will be apparent that turning of the nut 8 will cause it to travel toward or from the sleeve 7, and the nut is sufficiently long to be grasped by the hand and operated. When it turns against the sleeve 7, the sleeve will be moved against the washer 9 and pressure will be exerted on the inner end of the rubber sleeve 11 which by reason of the fixed nut 10 will expand and bulge out. When nut 8 travels away from the sleeve 7, the pressure on the rubber sleeve 11 will be relieved and it will assume its original normal position on the tube.

In use, the end of the plug with the rubber sleeve 11 is inserted into the pipe to be plugged, such as the pipe 4 of Fig. 1. It is preferably that the rubber sleeve 11 be initially expanded to a certain degree before insertion into the pipe in order to facilitate immediate further expansion. The travelling nut 8 is then turned by hand until the sleeve 11 is sufficiently expanded to cause a stoppage of water therearound. This ready insertion and expansion is permitted because the water in the pipe flows through the tube 5 and out through the transverse opening 17 which is normally concentric with the sleeve opening and out through the open end of the sleeve 12. The valve device 13 is then given a one-half turn by means of a tool inserted in the slot 16 to bring the solid portion of the body 15 facing the flow of water and thus block such flow. Because of the position of the valve device in the sleeve 12, it can very readily be manipulated by a tool.

The outer surface of the improved tool is smooth, uniform and free from radial projections and is shaped so as to readily be inserted into and removed from a small service pipe, such as a one-half inch pipe usually found in homes. While the valve device 13 is in blocking position a tool such as a threading tool can be moved over the plug device and the broken pipe repaired or threaded etc. and then a control valve can be inserted over the plug device and positioned on the newly threaded end to control the flow of water.

I claim:

An emergency plug for controlling and stopping the flow of water in a water pipe of small diameter comprising an elongated metal tubular member, an elongated metal sleeve member slidable on said tube, a fixed washer member at one end of the tube, an elongated rubber sleeve on the tube having one end in engagement with the fixed washer and its other end adapted to be engaged by said slidable sleeve for expanding said rubber sleeve, an elongated travelling nut on the tube adapted to move said slidable sleeve, a metal tubular sleeve member on the opposite end of the tube and forming an extension thereof and having opposite screw threaded openings in its wall adjacent its free end, all of said parts being concentrically arranged to form a surface free from radial projections to permit a tool to pass thereover, and a valve device mounted in the opposite openings in said extension, said valve including a cylindrical solid body portion having external screw threads in engagement with the threads in said opposite openings and having a transverse opening therethrough, said body portion being normally positioned in said extension with its ends flush with the surface of the extension and with its transverse opening concentric with the passage in the extension, said body portion being adapted to be given a one-half turn to move the transverse slot out of register with the passage and to block said passage to prevent flow of water therethrough.

GORDON C. FRENCH.